(12) United States Patent  (10) Patent No.: US 7,524,074 B2
Chery et al.  (45) Date of Patent: Apr. 28, 2009

(54) LIGHT GUIDE FOR A CONTROL KNOB FITTED WITH A ROTARY INDEX

(75) Inventors: Andre Chery, Ozoir la Ferriere (FR); Stephane Guichardon, Bougival (FR); Jerome Wroblewski, Maffliers (FR); Laurent Lucaora, Vanves (FR); Kevin Callahan, La Minerve (FR)

(73) Assignee: Valeo Systemes Thermiques S.A.S., Le Mesnil, St. Denis (FR)

( * ) Notice: Subject to any disclaimer, the term of this patent is extended or adjusted under 35 U.S.C. 154(b) by 238 days.

(21) Appl. No.: 11/409,948

(22) Filed: Apr. 24, 2006

(65) Prior Publication Data

US 2006/0238994 A1  Oct. 26, 2006

(30) Foreign Application Priority Data

Apr. 25, 2005 (FR) .................................. 05 04117

(51) Int. Cl.
 *G01D 11/28* (2006.01)
(52) U.S. Cl. .............................. 362/26; 362/29; 362/23; 362/551
(58) Field of Classification Search .................. 362/23, 362/26, 27, 29, 30, 602, 551, 555; 359/436, 359/440; 116/48, 49, 286–288
See application file for complete search history.

(56) References Cited

U.S. PATENT DOCUMENTS

| 4,734,918 | A |   | 3/1988 | Bauer et al. |
| 4,800,466 | A |   | 1/1989 | Bauer et al. |
| 4,916,591 | A |   | 4/1990 | Schiele |
| 6,210,011 | B1 | * | 4/2001 | Ikeuchi et al. ................. 362/26 |
| 6,224,221 | B1 | * | 5/2001 | Glienicke .................... 362/23 |
| 6,948,824 | B2 | * | 9/2005 | Miwa .......................... 362/26 |

* cited by examiner

*Primary Examiner*—Bao Q Truong
(74) *Attorney, Agent, or Firm*—Howard & Howard Attorneys PLLC

(57) ABSTRACT

This invention relates to a light guide (1) for a control knob, particularly an instrument panel of a vehicle. The knob is fitted with an index (3) free to move in rotation about an axis (A). The light guide (1) will be inserted between a light source (2) and the index (3) and comprises at least one entry surface (4) for light rays emitted by the light source (2), a first exit surface (6) of light rays towards the index (3) and side faces (5) inserted between the entry surface (4) and the first exit surface (6). The light guide comprises first optical means (4, 8, 15, 16) to orient received light rays approximately parallel to the rotation axis (A) of the index (3), and second optical means (5, 22, 14, 17, 18, 19, 20) to focus the previously reoriented light rays towards at least the first exit surface (6).

55 Claims, 6 Drawing Sheets

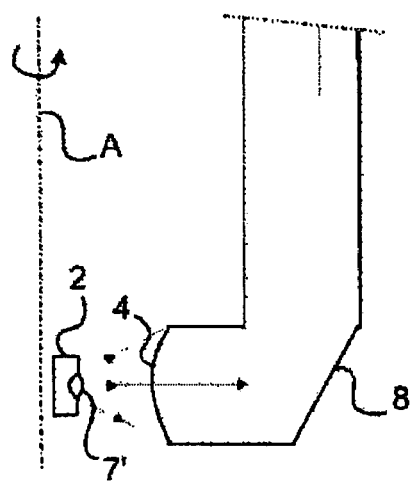
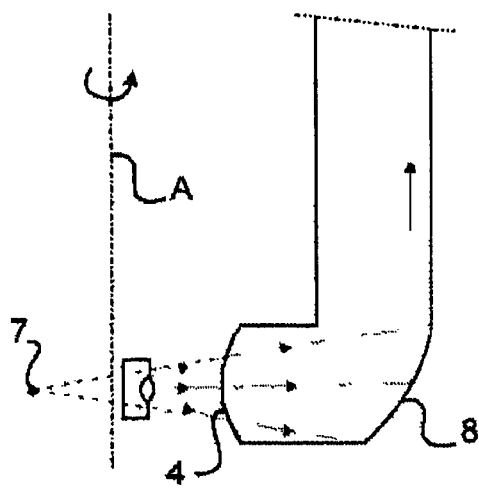
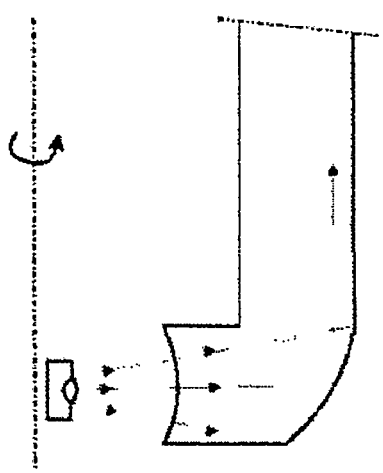
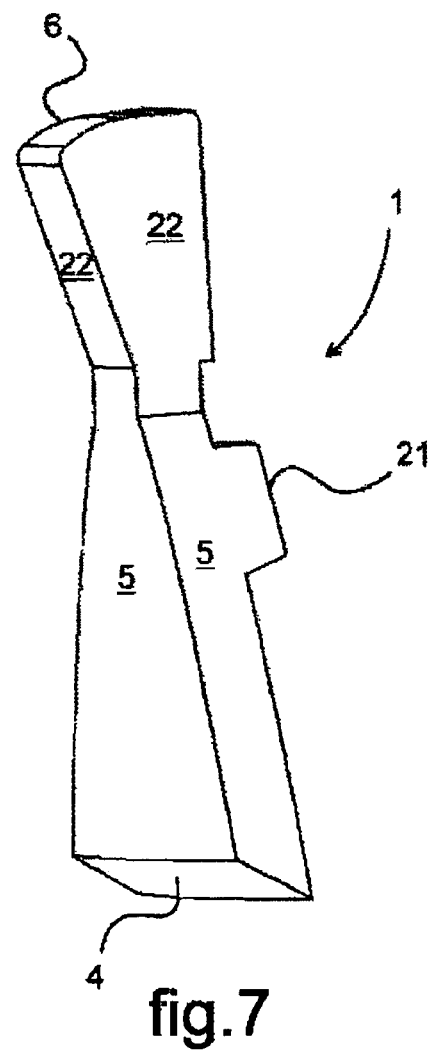
fig.4
fig.5
fig.6
fig.7

LIGHT GUIDE FOR A CONTROL KNOB FITTED WITH A ROTARY INDEX

TECHNICAL FIELD OF THE INVENTION

The invention relates to the field of lighting devices particularly for a vehicle instrument panel. More particularly, the invention relates to the field of lighting devices fitted on a control knob of such an instrument panel. Its purpose is a light guide inserted between a light source and a rotary index fitted on the control knob. Another purpose is an assembly device for such a light guide on a control knob, and a control knob fitted with such a light guide.

PRIOR ART

A vehicle instrument panel is fitted with a plurality of control knobs for controlling functional devices in the vehicle, for example such as ventilation, heating and/or air conditioning installation devices. It is known that the different knobs can be distinguished from each other by the use of distinctive symbols, for example formed on their surface. Such knobs may be free to rotate about their axis of symmetry, or they may be pushbuttons free to move in translation along this same axis, or even control knobs/buttons performing these two movements.

These knobs include knobs provided with an index free to move in rotation about the axis of symmetry of the knob with respect to markers on the instrument panel. For a rotary knob the index is integrated into the knob, while in the case of a pushbutton, the index is free to move in rotation about a body of a button free to move in translation. To control the use of a functional device of the vehicle, the driver rotates the index until it faces the marker on the instrument panel that corresponds to his application choice. This maneuver is performed starting from the rotation maneuver of either the rotary knob or the index, depending on the case mentioned above.

It is known that such control knobs can be provided with a lighting device for an area to be illuminated, such as the symbol or the rotary index. This device comprises a light source and an optically transparent light guide inserted between the source and the area to be illuminated. Among these devices, devices are known in which the light source is installed at the back of the instrument panel and close to the rotation axis of the index. The light guide comprises an entry surface for light rays emitted by said source, the intermediate surfaces reflecting received light rays and an exit surface for returned light rays. The rotary index is also made from an optically transparent material and is close to the exit surface of the light guide to diffuse the rays that it receives.

One fault of such light guides is due to the fact that they provide unsatisfactory luminous efficiency for light diffused by the index, in relation to light emitted by the light source. Furthermore, light diffused by the rotary index is not uniform and in particular depends on the position of the rotary index with respect to the light source.

Another problem that arises is the assembly of the index and the light guide on the control knob. They are commonly formed by overmolding on a hollowed out rotary body of the knob that is installed free to rotate on a support of the control panel. A decorative ring is placed at the outlet from the body so as to allow the index to emerge.

Such arrangements are not satisfactory with regard to the lighting uniformity obtained with the index. Furthermore, the formation of the index and the light guide by overmolding on the rotary body implies an expensive dual injection operation. Furthermore, if the shape of the light guide and/or the index is modified, the shape of the rotary body has to be modified accordingly, with the corollary that it is necessary to modify the mould used to make it. The result is the major disadvantage that it is impossible to use same rotary body for different shapes of light guides and indexes.

OBJECT OF THE INVENTION

The purpose of this invention is to propose a light guide arranged to limit light losses along the optical path of light rays emitted by the light source as far as an area to be illuminated such as a rotary index. More particularly, a light guide is proposed in which the arrangement of the surfaces satisfies the optical law of the total reflection. It also proposes a light guide for which an entry surface is arranged so that the apparent surface of this entry surface seen from the light source is as large as possible. Finally, this invention proposes such a light guide to enable uniform diffusion of light by the rotary index regardless of the position of the rotary index between its extreme rotation positions. Another purpose of this invention is to propose a control knob fitted with such a light guide. Another purpose of this invention is to propose a device for assembly of a light index and a light guide on a control knob, in order to optimize the use of lighting of the light index and the uniformity of this lighting. Furthermore, this invention proposes a control knob equipped with a light index and a light guide, the light index and the light guide being fixed in a manner that reduces the cost of making the control knob, and enables use of the rotary body in this control knob for the installation of a light index and a light guide with a relatively arbitrary shape.

The light guide according to this invention is a light guide for a control knob, particularly an instrument panel of a vehicle. The knob is fitted with an index free to move in rotation about an axis. The light guide will be inserted between a light source and the index and comprises at least one entry surface for light rays emitted by the light source, a first exit surface of light rays towards the index and side surfaces inserted between the entry surface and the first exit surface.

According to this invention, such a light guide is characterized primarily in that it comprises first optical means to orient received light rays approximately parallel to the rotation axis of the index, and second optical means to focus light rays previously oriented approximately parallel to the rotation axis of the index, towards at least the first exit surface.

The first optical means advantageously comprise the light guide entry surface.

According to a first embodiment, the entry surface is arranged to form a planar surface.

According to a second embodiment, the entry surface is arranged to form a spherical lens, for which the focal point is the light source and the optical axis is the rotation axis of the index.

According to a third embodiment, the entry surface is arranged to form a lens with a non-spherical surface.

According to a third embodiment, the entry surface is arranged to form a lens with a polynomial surface.

According to an alternative embodiment of the first optical means, they also advantageously comprise a mirror surface formed in the light guide facing the entry surface.

For example, the entry surface is arranged to form a portion of a cylinder with an axis parallel to the rotation axis of the index, while the mirror surface is arranged to form a parabola for which the focus is the light source.

According to another example embodiment, the entry surface is arranged to form a portion of a spherical lens for which the focal point is the light source while the mirror surface is arranged to form the surface of a cone with its axis parallel to the rotation axis of the index.

According to yet another example embodiment, the entry surface is arranged to form a portion of a toric lens for which the focal point is the light source while the mirror surface is arranged to form the surface of a cone with an axis parallel to the rotation axis of the index.

According to another example embodiment, the entry surface is arranged to form a portion of a spherical lens while the generating line of the mirror surface is a parabola for which the focal point is the image of the light source, this image being obtained through the entry surface.

According to a final example embodiment, the entry surface is arranged to form a portion of a toric lens while the generating line of the mirror surface is a parabola for which the focal point is the image of the light source, this image being obtained through the entry surface.

The second optical means advantageously comprise at least the side surfaces of the light guide.

For example, the corresponding generating line of each side surface is a parabola for which the focus is vertically in line with the first exit surface.

Preferably, the second optical means also comprise other planar surfaces inserted between the side surfaces and the first exit surface.

The second optical means also advantageously comprise a second exit surface formed in the light guide facing the entry surface to focus light rays received by the second exit surface to a symbol located on the knob.

The light guide is preferably made up of two basic light guides for which a first basic light guide comprises the first optical means and a second basic light guide at least partially comprises the second optical means.

The second optical means also advantageously comprise:
a first intermediate surface formed in the first basic guide facing the entry surface,
a side surface formed in the first basic light guide facing the first intermediate surface,
an entry surface formed in the second basic light guide facing the side surface, and
a second intermediate surface formed in the second basic light guide facing the entry surface.

The first intermediate surface may for example arranged to form a plurality of planar surfaces.

According to another example embodiment of the first intermediate surface, the generating line of this surface is a parabola, the focus of which is a point on the second basic light guide.

According to yet another example, the first intermediate surface is arranged to form the surface of a cone with an axis parallel to the axis of rotation of the index.

For example, the entry surface is arranged to form a portion of a cylinder with its axis parallel to the axis of rotation of the index, while the generating line of the second intermediate surface is a parabola, the focus of which is located at a point on the side surface.

According to another example embodiment of the entry surface, this entry surface is arranged to form a portion of a spherical lens for which the focal point is located on the side surface, while the second intermediate surface is arranged to form the surface of a cone with an axis parallel to the rotation axis of the index.

According to another example embodiment of the entry surface, this entry surface forms a portion of a toric lens for which the focal point is located on the side surface, while the second intermediate surface is arranged to form the surface of a cone with an axis parallel to the rotation axis of the index.

According to another example embodiment of the entry surface, this entry surface forms a portion of a spherical lens for which the focal point is located on the side surface, while the generating line for the second intermediate surface is a parabola for which the focal point is the image of a point on the side surface obtained through the entry surface.

According to a final example embodiment of the entry surface, this entry surface forms a portion of a toric lens for which the focal point is located on the side face, while the generating line for the second intermediate surface is a parabola for which the focal point is the image of a point on the side surface obtained through the entry face.

According to a first alternative, the light guide and the rotary index form a one-piece assembly.

According to another alternative, the second basic light guide and the rotary index form a one-piece assembly.

At least one of the side faces is preferably covered with a reflective coating.

For example, the exit surface may be frosted to diffuse the light rays that enter it.

According to another example embodiment of the exit face, the latter is covered with an overmolded diffusing material to diffuse the light rays that enter it.

A control knob according to this invention is equipped with at least one light guide as defined above.

According to one particular example embodiment, the control knob comprises a knob body free to move in translation along its axis of symmetry and an index free to move in rotation about this axis of symmetry.

According to another example embodiment of the control knob, it may, for example, be a rotary knob integrated into the index.

If applicable, the control knob may be provided with a symbol facing at least one exit surface from the light guide.

The control knob advantageously comprises a rotary body hollowed out in the axial direction fitted with means for reception of the light guide sliding in a socket joint. In particular, these socket joint reception means may form means for radial and rotational positioning and fixing on the body of the light guide. These reception means are advantageously associated with means for axially blocking the light guide on the body.

More particularly, these reception means include a recess formed in the internal surface of the rotary body to hold the light guide, and means for axially supporting this light guide.

Preferably, said recess comprises a first area conformed as a plane inclined in the axial direction with which the rear surface of the light guide comes into contact. Also preferably, said recess comprises a second area inclined along the axial direction and open for reception of the light index. The axial faces in the first and second zones are preferably oriented at an angle from each other.

According to a preferred example embodiment, said axial support means comprise a plate formed on the light guide and support tabs for this plate formed on the body. In particular, shape of the surface of the plate facing the wall of the body has a convex shape complementary to the concave shape of said wall of the body.

Preferably, said reception means comprise means for blocking the light guide bearing axially in contact with the support devices. These blocking means are advantageously composed of a decorative ring capping the open edge of the rotary body. More particularly, the decorative ring comprises a recess to allow the corresponding end of the light guide to pass through, forming the light index. Furthermore, the corresponding end surface of the decorative ring advantageously bears in contact with the plate to resist the opposing thrust of the plate in contact with the support devices.

In particular, the decorative ring is attached by being clipped onto the rotary body. For example, the decorative ring is provided with socket joint tabs inside the body, this body comprising guide slides for these socket joint tabs for radial position of the decorative ring on the rotary body. The socket joint tabs are advantageously arranged to form a foolproof system, and are preferably fitted with a hook at their free end cooperating with a corresponding housing formed on the body.

DESCRIPTION OF THE FIGURES

This invention will be better understood, and further details will become clearer after reading the description given with reference to the appended figures, wherein:

FIGS. 4, 5 and 6 are views showing details of the corresponding arrangements of an entry surface and a mirror-face of a light guide of the type shown in FIG. 2.

FIG. 7 is a perspective view of the light guide of the type shown in FIG. 1.

FIGS. 1 to 3 show corresponding alternative embodiments of a light guide 1 designed to be fitted on a control knob, particularly an instrument panel of a vehicle. The light guide 1 is arranged between a light source 2 and an index 3 fitted on the control knob. The index 3 is free to move in rotation about an axis such as the axis A of the knob, while the light source 2 is fixed on the knob closed to its axis A. The light guide 1, normally made by molding an optically transparent material, for example made of polycarbonate, comprises an entry surface 4 for light rays emitted by the light source 2, and side faces 5 that reflect rays received to a first exit surface 6. The entry surface 4 is located close to the light source 2, while the first exit surface 6 is located close to the index 3. The entry surface 4 is arranged so that its apparent surface S seen from the light source 2 is as large as possible.

Preferably, and according to the example embodiments described, the axis A is the rotation axis of the index 3.

Figure 1:
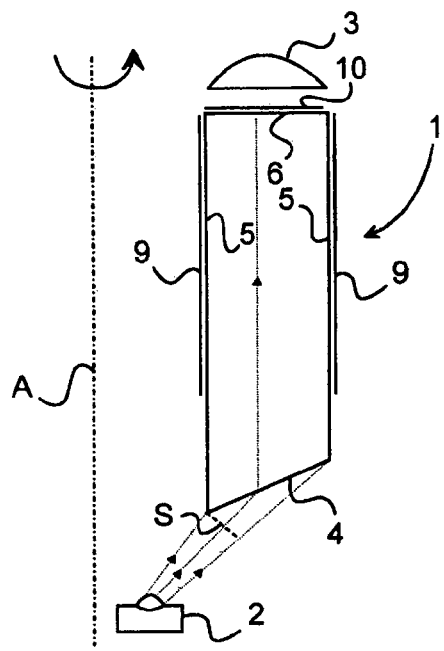
FIGS. 1, 2 and 3 are diagrammatic views of the light guide made according to alternatives of this invention.
Figure 3:
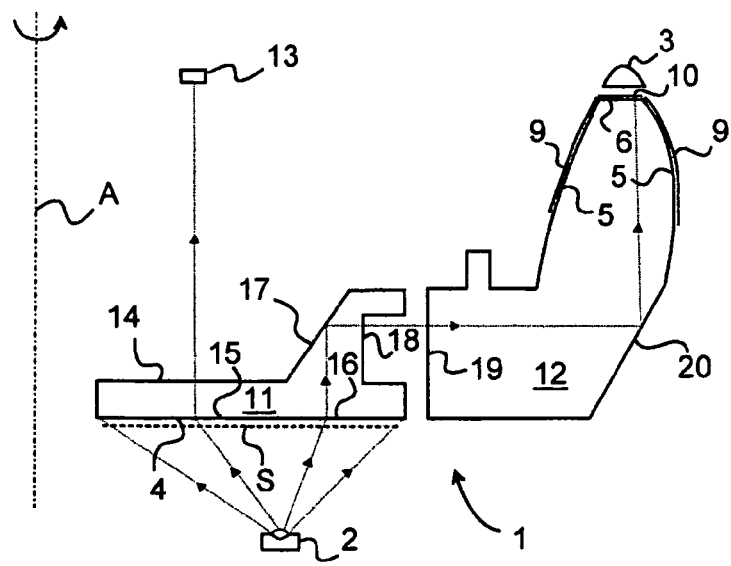

In FIGS. 1 and 3, the entry surface 4 is also arranged so that the light rays that it receives are oriented approximately parallel to the axis A. The entry surface 4 shown in these figures is arranged to form a planar surface and the rays refracted by this planar surface are parallel to the axis A of the index 3. However, depending on the arrangement of the index 3, the light rays are arranged approximately along the main direction of the index 3. The main direction is the largest axis along which the index 3 extends.

In other embodiments of the entry surface not shown in the figures, the entry surface may be arranged to form a spherical lens, for which the focal point is the light source and for which the optical axis is the axis of the index, or a lens with a non-spherical surface, or even a polynomial surface in order to even further optimize the optical path of the rays refracted inside the light guide.

Figure 2:
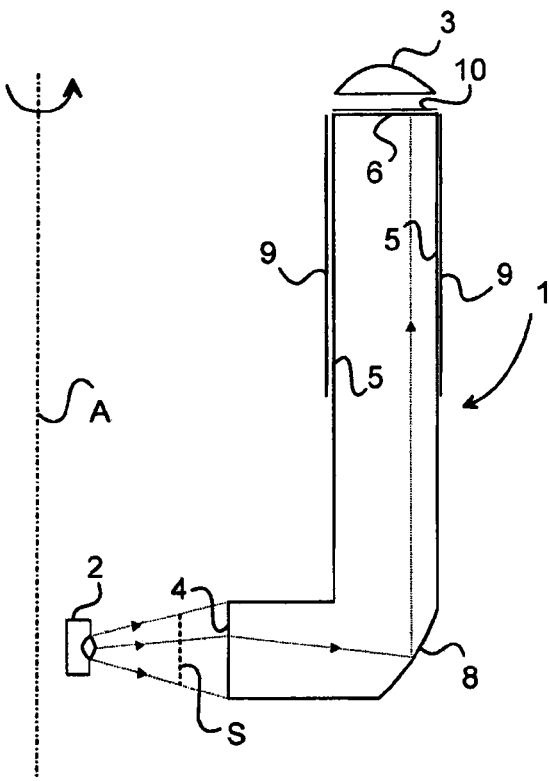

To further improve the size of the apparent surface of the entry surface 4 seen from the light source 2, the entry surface 4 of the light guide 1 shown in FIG. 2 is formed laterally in this light guide 1. To orient the rays received by the entry surface 4 parallel to the axis A of the index 3, this entry surface 4 is associated with a so-called "mirror" surface 8 formed in the light guide 1 facing the entry surface 4. The mirror surface 8 is arranged so that rays emitted through the entry surface 4 are integrally reflected by the mirror surface 8 according to the total reflection law.

Thus, the entry surface 4 can be arranged to form a portion of a cylinder with an axis parallel to the axis A of the index 3, the generating line of the mirror surface 8 being a parabola for which the focus is the light source 2 as shown in FIG. 2.

The entry surface 4 can also be arranged to form a portion of a spherical lens for which the focal point is the light source 2, the mirror surface 8 being arranged to form the surface of a cone with axis parallel to the axis A of the index 3 as shown in FIG. 4.

The entry surface 4 can also be arranged to form a portion of a spherical lens for which the focal point is the light source 2, the generating line of the mirror surface 8 being a parabola, this image 7 being obtained through the entry surface 4 as shown in FIG. 5.

According to an example embodiment not shown, the entry surface is arranged to form a portion of a spherical lens for which the focal point is the light source, the mirror surface being the surface of a cone with axis parallel to the axis of the index.

According to an example embodiment not shown, the entry surface is arranged to form a portion of a toric lens for which the focal point is the light source, the mirror surface being the surface of a cone with axis parallel to the rotation axis of the index.

The entry surface 4 is also arranged in the form of a portion of a toric lens for which the focal point is the light source 2, the generating line of the mirror surface 8 is a parabola, this image 7' is obtained through the entry surface 4 as shown in FIG. 6.

In FIGS. 1 to 3, the side faces 5 of the light guide 1 are arranged to focus light rays previously oriented parallel to the axis A of the index 3 towards the first exit surface 6. The generating lines of the side faces 5 are parabolas for which the focus is vertically in line with the first exit surface 6. The light rays that penetrate the entry surface 4 are made parallel to the axis A of the index 3 through the entry surface 4, and are then focused after reflection on the side faces 5 towards the first exit surface 6. Preferably, the parabolas are defined so as to respect the total reflection law. The side faces 5 are preferably covered with a reflective coating 9, for example deposited by vacuum deposition or by anodization to limit refraction on these faces 5.

In FIG. 3, the light guide 1 is composed of a first basic light guide 11 and a second basic light guide 12. Light emitted by the light source 2 is designed to illuminate either a symbol 13 on the control knob facing a second exit surface 14 formed in the first basic light guide 11, or the rotary index 3 facing the first exit surface 6 formed in the second basic light guide 12.

The first basic light guide 11 comprises the entry surface 4 and the second exit surface 14. The entry surface 4 participates simultaneously in illuminating the symbol 13 on the control knob and the rotary index 3. To achieve this, the entry surface 4 comprises a first basic entry surface 15 and a second basic entry surface 16, for which the corresponding layouts may be different from each other and chosen from among an arrangement forming a planar surface, an arrangement forming a spherical lens for which the focal point is the light source 2 and for which the optical axis is the axis A of the index 3, or an arrangement forming a lens with a non-spherical surface, or even a polynomial surface.

The first basic entry surface 15 and the second exit surface 14 are arranged facing each other in the central part of the first basic guide 11 to form a lens with a relatively constant thickness. Ideally, the thickness of the lens is small to prevent shrinkage problems of the first basic light guide 11 during its manufacture by molding. These arrangements are such that illumination of the symbol 13 is optimized for a given light quantity supplied by the light source 2.

The first basic light guide 11 also comprises a first intermediate surface 17 formed facing the second basic entry surface 16, and a side surface 18 formed facing the first intermediate surface 17. According to various embodiments, the first intermediate surface 17 may be arranged in a plurality of planar surfaces or forming the surface of a cone with an axis parallel to the axis A of the index 3. It is also possible that the generating line of the first intermediate surface 17 is a parabola for which the focus is a point on the second basic guide 12. The side surface 18 may be arranged to focus the light rays from the first intermediate surface 17 towards the second basic guide 12.

The second basic guide 12 comprises an entry surface 19 formed facing the side surface 18 of the first basic light guide 12, a second intermediate surface 20 formed facing the entry surface 19, the side faces 5 and the first exit surface 6. The arrangement and the nature of the entry surface 19 and the second intermediate surface 20 are similar to the arrangement and nature of the entry surface 4 and the mirror surface 8 of the light guide 1 of the type shown in FIG. 2.

More particularly, and as an example, the entry surface 19 is arranged to form a portion of a cylinder with its axis parallel to the axis A of the index 3 and the generating line of the second intermediate surface 20 is a parabola for which the focus is located at a point on the side surface 18. Similarly, the entry surface 19 is arranged to form a portion of a spherical lens for which the focal point is located on the side surface 18 and the second intermediate surface 20 is arranged to form the surface of a cone with its axis parallel to the axis A of the index 3. It is also possible that the entry surface 19 is arranged to form a portion of a toric lens for which the focal point is located on the side surface 18 and that the second intermediate surface 20 is arranged to form the surface of a cone with its axis parallel to the rotation axis of the index 3. The entry surface 18 can also be arranged to form a portion of a spherical lens; the generating line of the second intermediate surface 20 being a parabola for which the focal point is an image of a point on the side surface 18 obtained through the entry surface 19. Finally, the entry surface 18 can be arranged to form a portion of a toric lens while the generating line of the second intermediate surface 20 is a parabola for which the focal point is the image of a point of the side surface 18 obtained through the entry surface 19.

In various embodiments of the first and second exit faces 6, 14, the latter can be frosted or covered with a diffusing overmolded material 10 to diffuse the light rays that enter them.

In FIG. 7, the light guide 1 comprises a pin 21 to fasten it by a socket joint or a similar means in a control knob. This pin 21 is formed in a side surface 5 of the light guide 1. Furthermore, the light guide 1 comprises additional faces 22 inserted between the side faces 5 and the first exit surface 6. These additional faces 22 are arranged to form corresponding planar surfaces to enable total reflection of light rays reflected successively by the side faces 5 and additional faces 22.

Figure 8:
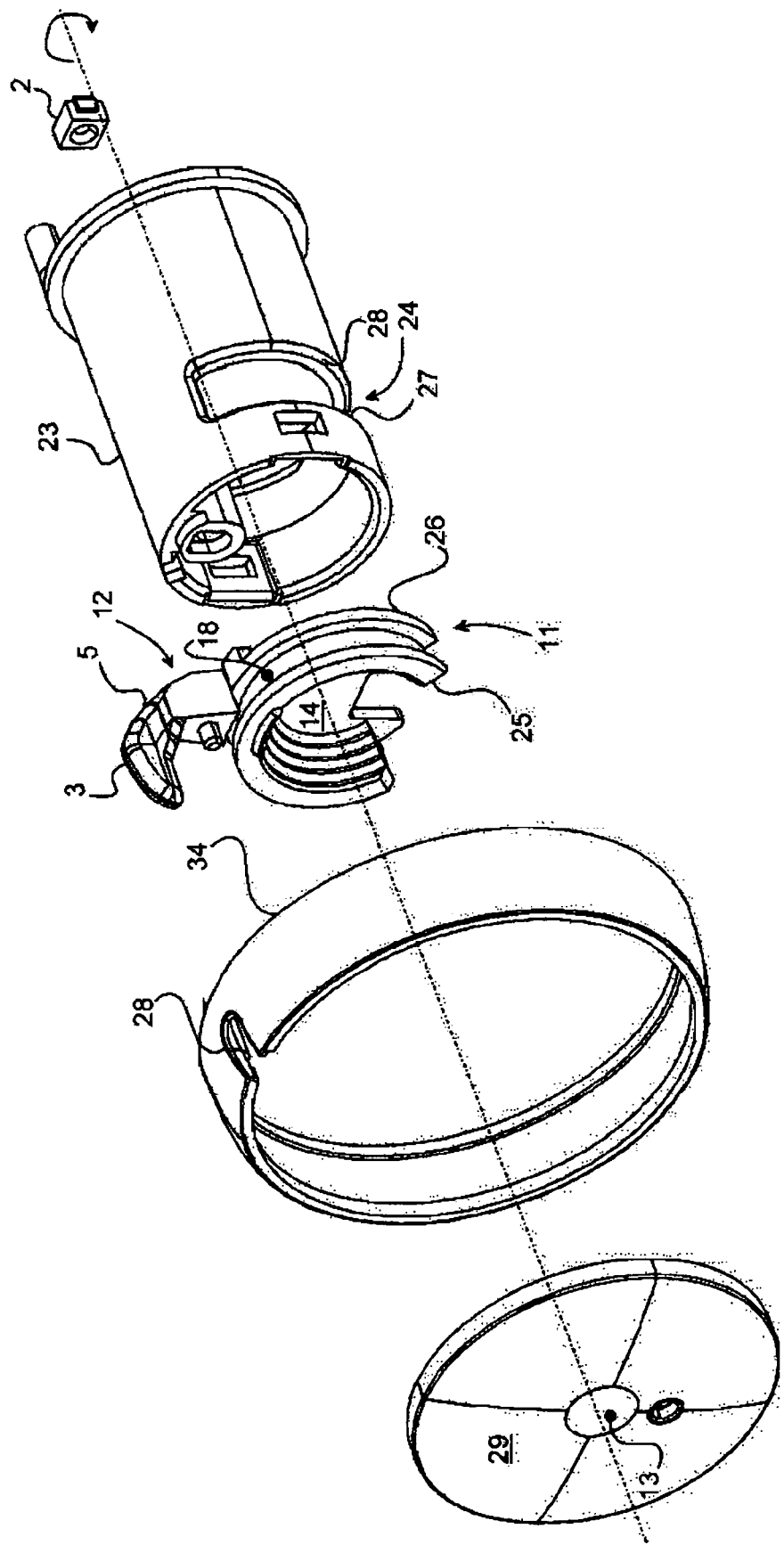
FIG. 8 is an exploded perspective view of a control knob fitted with a light guide of the type shown in FIG. 3.

In FIG. 8, a pushbutton-type control knob is fitted with a light guide 1 composed of a first basic light guide 11 and a second basic light guide 12 of the types shown in FIG. 3. The control knob comprises a knob body 23 free to move in translation along the axis A of the knob. The general shape of the knob body is cylindrical, and it comprises a cut-out 24 in its surface of revolution forming a window designed to hold the first basic light guide 11. It is found that this basic light guide 11 can move in translation along the axis A of the control knob.

The first basic light guide 11 is made in the shape of a ring for which the axial faces 25, 26 fit in a socket joint in contact with the edges 27, 28 of the window 24. The first basic light guide 11 comprises the first exit surface 14 arranged radially at the edge of the ring, being arranged approximately parallel to the entry face.

The control knob also comprises a ring 34 free to rotate about the axis A of the knob. This ring 34 comprises a longitudinal chase 28 into which the second basic light 24 fits by a socket joint or similar means. It is found that the second basic light guide 12 is free to move in rotation about the first basic guide 11 free to move in translation. The ring 34 is fitted with a cover 29 provided with its symbols 13 illuminated by light rays originating from the second exit surface 14.

In the alternative embodiment shown, the second basic light guide 12 forms a one-piece assembly with the index 3 supported by the ring 34.

Figure 9:
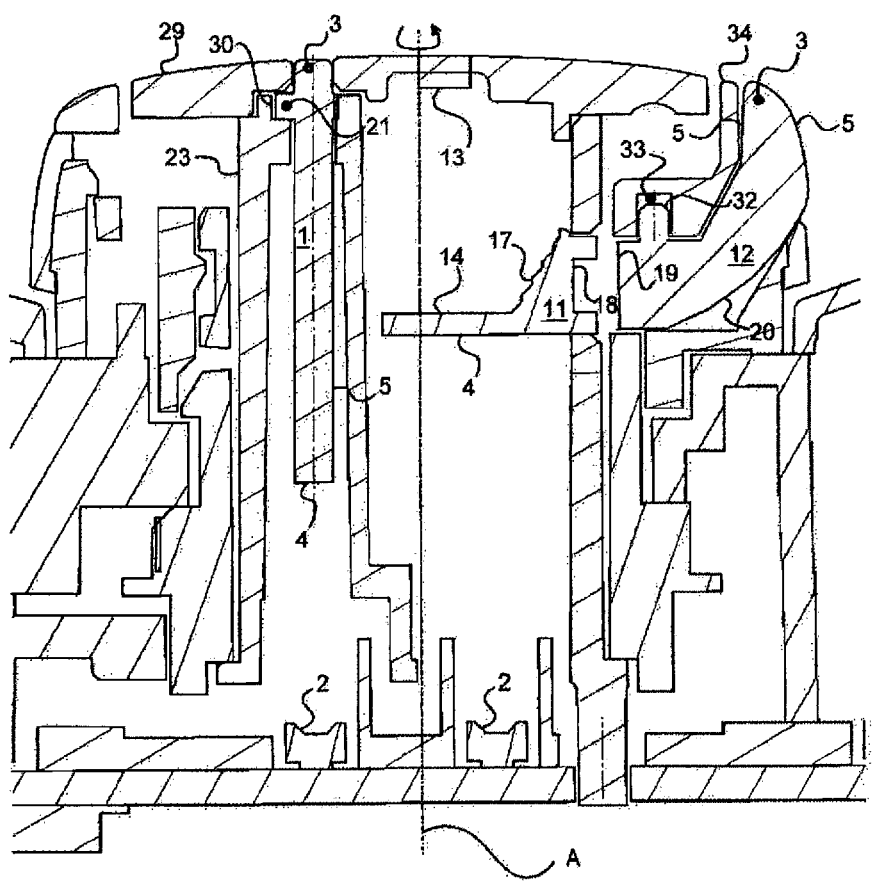
FIG. 9 is a sectional view of a control knob fitted with a first light guide of the type shown in FIG. 1 and a second light guide of the type shown in FIG. 3.

FIG. 9 shows the respective integration of two light guides 1; 11, 12 in a pushbutton type control knob, the first 1 of the type shown in FIG. 1 and a second 11, 12 of the type shown in FIG. 3. The control knob is provided with two light sources 2 arranged close to and on opposite sides of this axis A. The first light guide 1 comprises a pin 30 that fits into a first housing formed between the body 23 of the control knob and the cover 29, in a socket joint. The second basic light guide 12 comprises a holding pin 32 that fits into a second housing formed in the ring 27, in a socket joint.

In the alternative embodiment illustrated, the second basic light guide 12 forms a one-piece assembly with a first index 3 and the first light guide 1 also forms a one-piece assembly with a second index 3.

Figure 10:
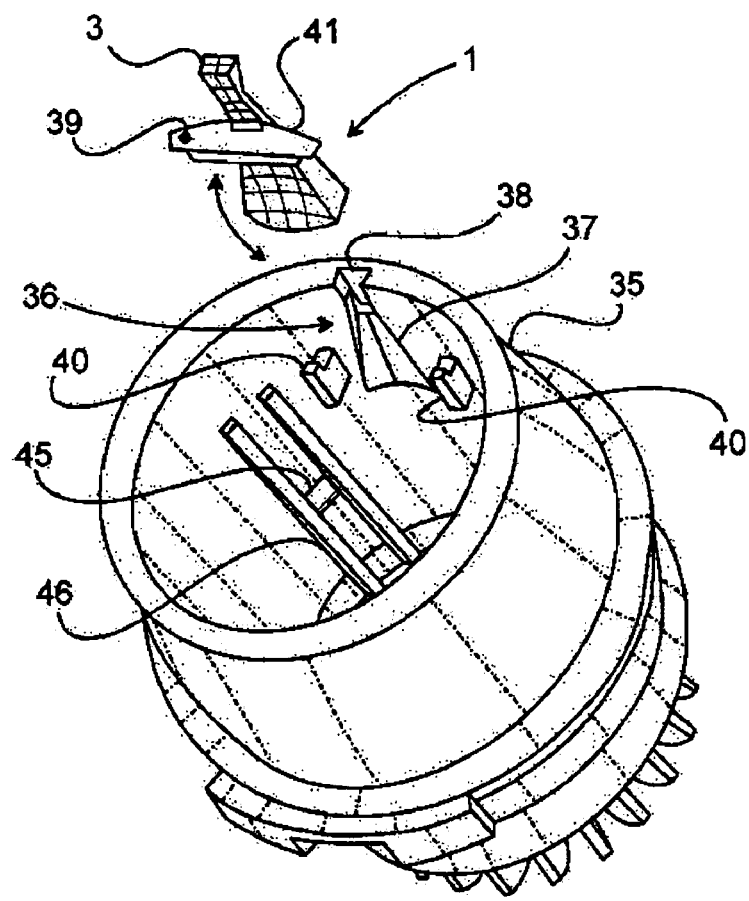
FIG. 10 is an exploded perspective view.
Figure 11:
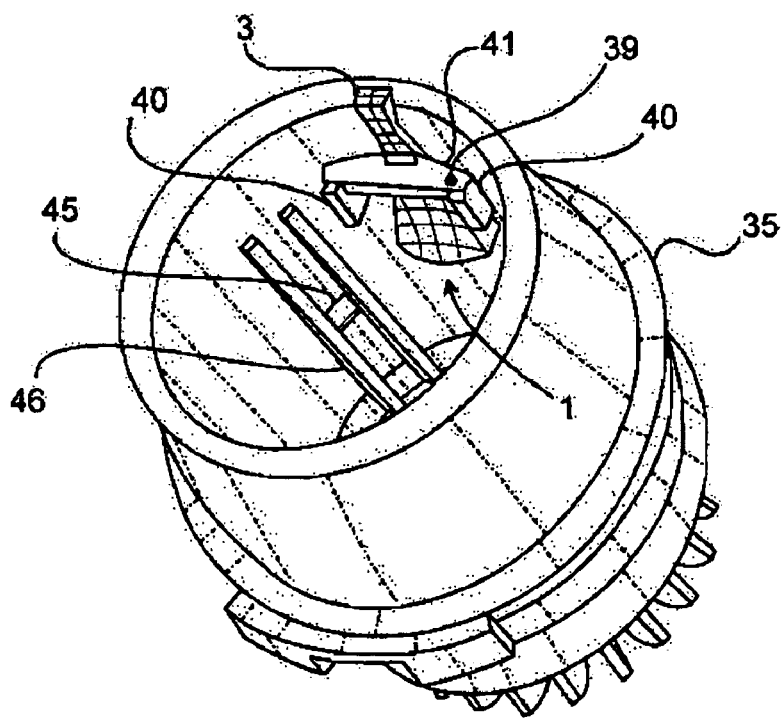
FIG. 11 an assembled perspective view of a rotary body and a light guide fitted on a control knob according to the invention.
Figure 12:
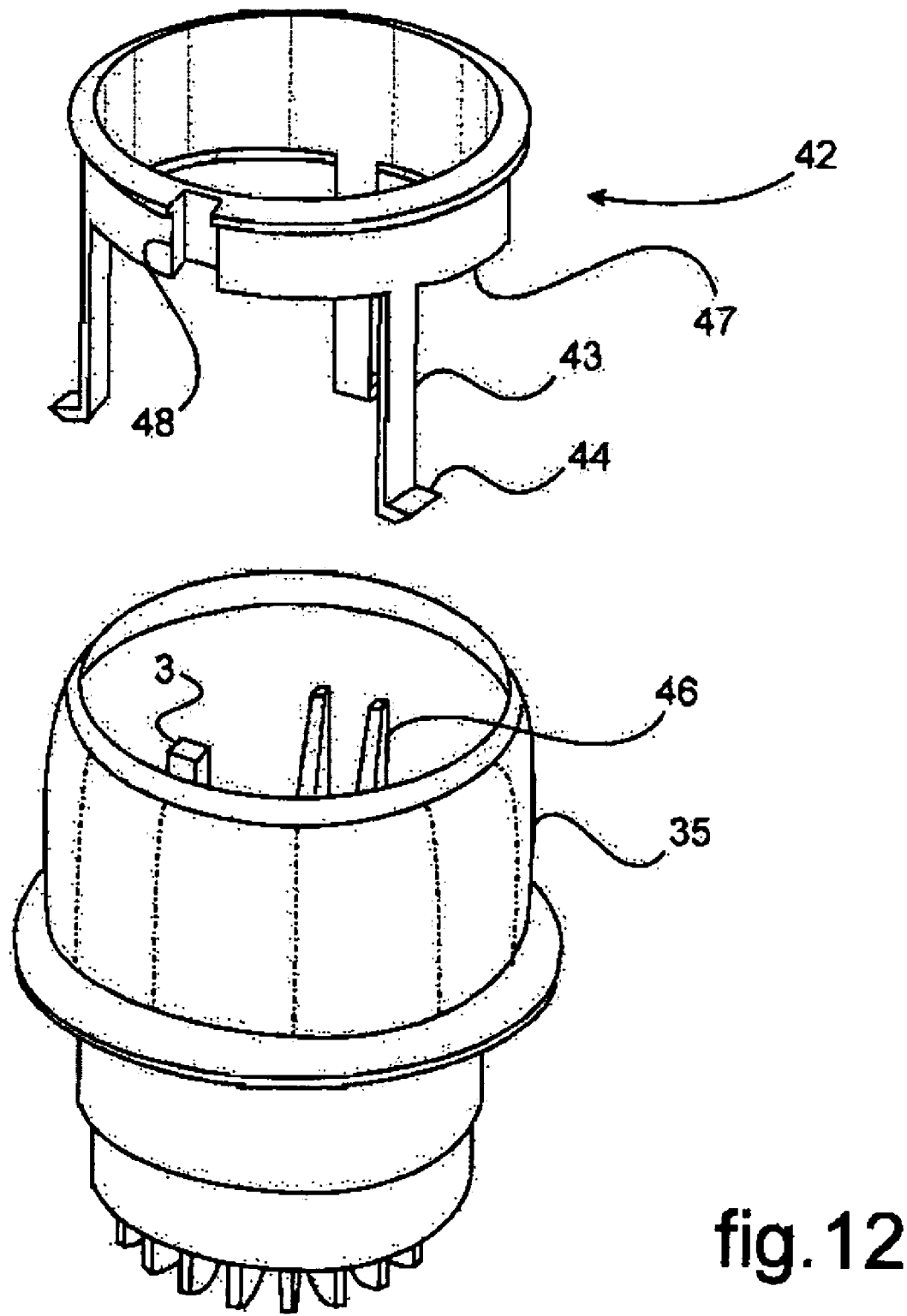
FIG. 12 is an exploded perspective illustration of the rotary body on which the light guide is mounted as shown in FIGS. 10 and 11, fitted with a decorative axial support ring for the light guide.

In FIGS. 10 to 12, a light guide 1 is added onto a hollowed out rotary body 35 formed in the control knob in a socket joint. This body 35 is designed to be free to rotate on a support of a control panel, not shown. More particularly, the light guide is fixed in the radial direction and is connected to the body 35 in rotation through a socket joint connection between the light guide 1 and the body 35. Adding the light guide 1 onto the body 35 by a socket joint means that each of these elements can be made separately. Furthermore, the body 35 can hold light guides 1 in which the reflection faces are organized in specific shapes, and only the faces of the light guides 1 designed to cooperate with the body 35 through a socket joint can be identical from one light guide to another.

In FIGS. 10 and 11, the socket joint connection between the light guide 1 and the body 35 is made by means of a groove 36 formed on the body 35 for reception of the light guide 1. This groove 36 comprises a first area 37 for main entry of the light guide 1 and a second area 38 for entry of the end of the light guide, that forms the light index 3. These first and second areas 37, 38 of the groove 36 are inclined with respect to the internal surface of the body 35 in the axial direction, being oriented at an angle from each other.

The light guide 1 is provided with an axial support plate 39 inside the body 35. This plate 39 can bear on support devices 40 fitted in the body 35 for axial positioning of the light guide 1. In particular, these support devices 40 are formed of tabs arranged as hooks to retain the plate 40. The plate comprises a convex surface 41 that will match the concave shape of the inside surface of the body 35.

As also shown in FIG. 12, the control knob also comprises a decorative chrome plated ring 42. This ring 42 is added onto the body by click fitting using tabs 43, the free ends of which are arranged as hooks 44. These hooks 44 are designed to cooperate with complementary housings 45 formed on the body 35 through a socket joint. The tabs 43 are distributed radially around the periphery of the ring, and are organized to form a fool proofing system. For example, if there are three tabs 43, one of the tabs 43 will be larger than the others. These tabs fit inside radial positioning slides 46 in the body 35.

The ring 42 is advantageously used for axial locking of the light guide 1 inside the body 35. The corresponding end surface 47 of the ring 42 is designed to bear in contact with the plate 39, so that the plate fits behind the support tabs 40. The ring comprise a recess 48 around its periphery through which the corresponding end of the light guide 1 that forms the light index 3 can pass.

The invention claimed is:

1. A control knob comprising:
    a light guide (1) inserted between a light source (2) and an index (3) free to move in rotation about an axis (A), said light guide (1) comprising at least one entry surface (4) for light rays emitted by the light source (2), a first exit surface (6) of light rays towards the index (3), and said light guide (1) comprising a first optical part (4, 8, 15, 16) to orient received light rays approximately parallel to the rotation axis (A) of the index (3), and a second optical part (5, 22, 14, 17, 18, 19, 20) to focus light rays towards at least the first exit surface (6); and
    a rotary body (35) hollowed out in the axial direction fitted with a reception part for reception of the light guide (1) sliding in a socket joint;
    the reception part including a recess (36) formed in the internal surface of the body (35) and an axial support part for axially supporting this light guide (1); and
    the axial support part comprising a plate (39) formed on the light guide (1) and support tabs (40) for this plate (39) formed on the body (35).

2. The control knob according to claim 1, characterized in that the first optical part (4, 8, 15, 16) comprise the entry surface (4, 15, 16) of the light guide (1).

3. The control knob according to claim 2, characterized in that the entry surface (4, 15, 16) is arranged to form a planar surface.

4. Light guide according to claim 2, characterized in that the entry surface (4, 15, 16) is arranged to form a spherical lens, for which the focal point is the light source (2) and the optical axis is the rotation axis (A) of the index (3).

5. Light guide according to claim 2, characterized in that the entry surface (4, 15, 16) is arranged to form a lens with a non-spherical surface.

6. Light guide according to claim 2, characterized in that the entry surface (4, 15, 16) is arranged to form a lens with a polynomial surface.

7. Light guide according to one of claims 2 to 6, characterized in that the first optical means (4, 8, 15, 16) also comprise a mirror surface (8) formed in the light guide (1).

8. Light guide according to claim 7, characterized in that 15 the mirror surface (8) is arranged to form a parabola for which the focus is the light source (2).

9. Light guide according to claim 7, characterized in that the mirror surface (8) is arranged to form the surface of a cone with its axis parallel to the rotation axis (A) of the index (3).

10. Light guide according to claim 7, characterized in that the mirror surface (8) is a parabola for which the focal point is the image of the light source (2) obtained through the entry surface (4).

11. The control knob according to claim 1, characterized in that the second optical part (5, 22, 14, 17, 18, 19, 20) comprise at least side faces (5) of the light guide (1).

12. Light guide according to claim 11, characterized in that each side surface (5) is a parabola for which the focus is vertically in line with the first exit surface (6).

13. The control knob according to claim 11, characterized in that the second optical part (5, 22, 14, 17, 18, 19, 20) also comprise other plane faces (22) inserted between the side faces (5) and the first exit surface (6).

14. Light guide according to one of claims 11 to 13, characterized in that the second optical means (5, 22, 14, 17, 18, 19, 20) also advantageously comprise a second exit surface (14) formed in the light guide (1) facing the entry surface (4) to focus light rays received by the second exit surface (14) to a symbol (13) located on the knob.

15. Light guide according to one of the above claims, characterized in that it is made up of a first basic light guide (11) comprising the first optical means (4, 8, 15, 16) and a second basic light guide (12) at least partially comprising the second optical means (5, 22, 14, 17, 18, 19, 20).

16. Light guide according to claim 15, characterized in that the second optical means (5, 22, 14, 17, 18, 19, 20) also comprise:
    a first intermediate surface (17) formed in the first 5 basic guide (11) facing the entry surface (4),
    a side surface (18) formed in the first basic light guide (11) facing the first intermediate surface (17),
    an entry surface (19) formed in the second basic light guide (12) facing the side surface (18), and
    a second intermediate surface (20) formed in the second basic light guide (12) facing the entry surface (19).

17. Light guide according to claim 16, characterized in that the first intermediate surface (17) is a parabola, the focus of which is a point on the second basic light guide (12).

18. Light guide according to claim 16, characterized in that the first intermediate surface (17) is a cone with an axis parallel to the axis (A) of the index (3).

19. Light guide according to one of claims 16 to 18, characterized in that the second intermediate surface (20) is a parabola, the focus of which is located at a point on the side surface (18).

20. Light guide according to one of claims 16 to 18, characterized in that the second intermediate surface (20) is arranged to form the surface of a cone with an axis parallel to the axis (A) of the index (3).

21. Light guide according to one of claims 16 to 20, characterized in that the entry surface (19) is arranged to form a portion of a cylinder with an axis parallel to the axis (A) of the index (3).

22. Light guide according to one of claims 16 to 20, characterized in that the entry surface (19) forms a portion of a spherical lens.

23. Light guide according to one of claims 16 to 20, characterized in that the entry surface (19) forms a portion toric lens.

24. The control knob according to claim 1, characterized in that the control knob comprises at least one side face (5) covered with a reflective coating (9).

25. The control knob according to claim 1, characterized in that the exit surface (6, 14) is frosted to diffuse the light rays that enter the control knob.

26. The control knob according to claim 1, characterized in that the exit surface (6, 14) is covered with an overmolded diffusing material (10) to diffuse the light rays that enter the control knob.

27. The control knob according to claim 1, characterized in that the rotary body (35) is free to move in translation along its axis of symmetry (A) and an index (3) free to move in rotation about this axis of symmetry (A).

28. The control knob according to claim 1, characterized in that the reception part comprises a blocking part for blocking the light guide (1) bearing axially in contact with the support devices (40).

29. The control knob according to claim 28, characterized in that the blocking part is composed of a decorative ring (42) capping the open edge of the body (35).

30. The control knob according to claim 29, characterized in that the decorative ring (42) comprises a recess (48) to allow the corresponding end of the light guide (1) to pass through, forming the light index (3).

31. The control knob according to claim 29, characterized in that the decorative ring (42) is fitted by clipping on the rotary body (35).

32. A control knob comprising:
a light guide (1) inserted between a light source (2) and an index (3) free to move in rotation about an axis (A), said light guide (1) comprising at least one entry surface (4) for light rays emitted by the light source (2), a first exit surface (6) of light rays towards the index (3), and said light guide (1) comprising a first optical part (4, 8, 15, 16) to orient received light rays approximately parallel to the rotation axis (A) of the index (3), and a second optical part (5, 22, 14, 17, 18, 19, 20) to focus light rays towards at least the first exit surface (6); and
a rotary body (35) hollowed out in the axial direction fitted with a reception part for reception of the light guide (1) sliding in a socket joint;
the reception part including a recess (36) formed in the internal surface of the body (35) and an axial support part for axially supporting this light guide (1); and
the reception part comprising a blocking part for blocking the light guide (1) bearing axially in contact with the support devices (40).

33. The control knob according to claim 32, characterized in that the first optical part (4, 8, 15, 16) comprise the entry surface (4, 15, 16) of the light guide (1).

34. The control knob according to claim 33, characterized in that the entry surface (4, 15, 16) is arranged to form a planar surface.

35. The control knob according to claim 32, characterized in that the second optical part (5, 22, 14, 17, 18, 19, 20) comprise at least side faces (5) of the light guide (1).

36. The control knob according to claim 35, characterized in that the second optical part (5, 22, 14, 17, 18, 19, 20) also comprise other plane faces (22) inserted between the side faces (5) and the first exit surface (6).

37. The control knob according to claim 32, characterized in that the control knob comprises at least one side face (5) covered with a reflective coating (9).

38. The control knob according to claim 32, characterized in that the exit surface (6, 14) is frosted to diffuse the light rays that enter the control knob.

39. The control knob according to claim 32, characterized in that the exit surface (6, 14) is covered with an overmolded diffusing material (10) to diffuse the light rays that enter the control knob.

40. The control knob according to claim 32, characterized in that the rotary body (35) is free to move in translation along its axis of symmetry (A) and an index (3) free to move in rotation about this axis of symmetry (A).

41. The control knob according to claim 32, characterized in that the axial support part comprises a plate (39) formed on the light guide (1) and support tabs (40) for this plate (39) formed on the body (35).

42. The control knob according to claim 32, characterized in that the blocking part is composed of a decorative ring (42) capping the open edge of the body (35).

43. The control knob according to claim 42, characterized in that the decorative ring (42) comprises a recess (48) to allow the corresponding end of the light guide (1) to pass through, forming the light index (3).

44. The control knob according to claim 42, characterized in that the decorative ring (42) is fitted by clipping on the rotary body (35).

45. A control knob comprising:
a light guide (1) inserted between a light source (2) and an index (3) free to move in rotation about an axis (A), said light guide (1) comprising at least one entry surface (4) for light rays emitted by the light source (2), a first exit surface (6) of light rays towards the index (3), and said light guide (1) comprising a first optical part (4, 8, 15, 16) to orient received light rays approximately parallel to the rotation axis (A) of the index (3), and a second optical part (5, 22, 14, 17, 18, 19, 20) to focus light rays towards at least the first exit surface (6);
a rotary body (35) hollowed out in the axial direction;
a cover (29) extending transverse to the axis (A) and defining a housing between the body (35) and the cover (29);
the light guide (1) including a pin (30) that fits into the housing for axially supporting the light guide (1).

46. The control knob according to claim 45, characterized in that the first optical part (4, 8, 15, 16) comprise the entry surface (4, 15, 16) of the light guide (1).

47. The control knob according to claim 45, characterized in that the second optical part (5, 22, 14, 17, 18, 19, 20) comprise at least side faces (5) of the light guide (1).

48. The control knob according to claim 45, characterized in that the control knob comprises at least one side face (5) covered with a reflective coating (9).

49. The control knob according to claim 45, characterized in that the exit surface (6, 14) is frosted to diffuse the light rays that enter the control knob.

50. The control knob according to claim 45, characterized in that the exit surface (6, 14) is covered with an overmolded diffusing material (10) to diffuse the light rays that enter the control knob.

51. The control knob according to claim 45, characterized in that the rotary body (35) is free to move in translation along its axis of symmetry (A) and an index (3) free to move in rotation about this axis of symmetry (A).

52. The control knob according to claim 45, characterized in that the reception part comprises a blocking part for blocking the light guide (1) bearing axially in contact with the support devices (40).

53. The control knob according to claim 52, characterized in that the blocking part is composed of a decorative ring (42) capping the open edge of the body (35).

54. The control knob according to claim 53, characterized in that the decorative ring (42) comprises a recess (48) to allow the corresponding end of the light guide (1) to pass through, forming the light index (3).

55. The control knob according to claim 53, characterized in that the decorative ring (42) is fitted by clipping on the rotary body (35).

* * * * *

UNITED STATES PATENT AND TRADEMARK OFFICE
CERTIFICATE OF CORRECTION

PATENT NO. : 7,524,074 B2
APPLICATION NO. : 11/409948
DATED : April 28, 2009
INVENTOR(S) : Andre Chery et al.

It is certified that error appears in the above-identified patent and that said Letters Patent is hereby corrected as shown below:

Column 9, line 49, delete "Light guide" and replace with --A control knob--.
Column 9, line 50, delete "means" and replace with --part--.
Column 9, line 53, delete "Light guide" and replace with --A control knob--.
Column 9, line 56, delete "Light guide" and replace with --A control knob--.
Column 9, line 59, delete "Light guide" and replace with --A control knob--.
Column 9, line 62, delete "15" located between "that" and "the".
Column 9, line 62, delete "Light guide" and replace with --A control knob--.
Column 9, line 65, delete "Light guide" and replace with --A control knob--.
Column 10, line 1, delete "Light guide" and replace with --A control knob--.
Column 10, line 8, delete "Light guide" and replace with --A control knob--.
Column 10, line 9, delete "side surface" and replace with --side face--.
Column 10, line 14, delete "one of claims 11 to 13" and replace with --claim 11--.
Column 10, line 15, delete "Light guide" and replace with --A control knob--.
Column 10, line 15, delete "means" and replace with --part--.
Column 10, line 18, delete "5" located between "first" and "basic".
Column 10, line 20, delete "Light guide" and replace with --A control knob--.
Column 10, line 20, delete "one of the above claims" and replace with --claim 1--.
Column 10, line 22, delete "means" and replace with --part--.
Column 10, line 24, delete "means" and replace with --part--.
Column 10, line 25, delete "Light guide" and replace with --A control knob--.
Column 10, line 26, delete "means" and replace with --part--.
Column 10, line 35, delete "Light guide" and replace with --A control knob--.
Column 10, line 38, delete "Light guide" and replace with --A control knob--.
Column 10, line 41, delete "Light guide" and replace with --A control knob--.
Column 10, line 45, delete "Light guide" and replace with --A control knob--.
Column 10, line 49, delete "Light guide" and replace with --A control knob--.
Column 10, line 49, delete "one of claims 16 to 20" and replace with --claim 16--.
Column 10, line 53, delete "Light guide" and replace with --A control knob--.
Column 10, line 53, delete "one of claims 16 to 20" and replace with --claim 16--.
Column 10, line 56, delete "Light guide" and replace with --A control knob--.

UNITED STATES PATENT AND TRADEMARK OFFICE
CERTIFICATE OF CORRECTION

PATENT NO.         : 7,524,074 B2
APPLICATION NO.    : 11/409948
DATED              : April 28, 2009
INVENTOR(S)        : Andre Chery et al.

It is certified that error appears in the above-identified patent and that said Letters Patent is hereby corrected as shown below:

Column 10, line 56, delete "one of claims 16 to 20" and replace with --claim 16--.

Signed and Sealed this

Twenty-second Day of September, 2009

David J. Kappos
*Director of the United States Patent and Trademark Office*